United States Patent [19]

Kitai

[11] 3,786,733

[45] Jan. 22, 1974

[54] ILLUMINATION-TIME CHARACTERISTIC CIRCUIT FOR ELECTRIC EYE CAMERAS

[75] Inventor: Kiyoshi Kitai, Tokyo, Japan

[73] Assignee: Kabushiki Kaisha Hattori Tokeiten, Tokyo, Japan

[22] Filed: Mar. 26, 1973

[21] Appl. No.: 345,118

Related U.S. Application Data

[63] Continuation of Ser. No. 127,103, March 23, 1971, abandoned.

[30] Foreign Application Priority Data

Mar. 25, 1970 Japan ............................... 45-24481

[52] U.S. Cl. ............................................ 95/10 CT
[51] Int. Cl. ............................................ G03b 7/08
[58] Field of Search .................................. 95/10 CT

[56] References Cited

UNITED STATES PATENTS

| | | | |
|---|---|---|---|
| 3,500,729 | 3/1970 | Rentschler et al. | 95/10 |
| 3,522,763 | 8/1970 | Dietz | 95/10 |
| 3,636,842 | 1/1972 | Nobusawa | 95/10 |

*Primary Examiner*—Samuel S. Matthews
*Assistant Examiner*—Michael L. Gellner
*Attorney, Agent, or Firm*—Robert E. Burns et al.

[57] ABSTRACT

A built-in exposure timer circuit for electric eye cameras automatically correcting the exposure time of a photographic exposure by compensation for the non-linearity of the illumination-resistance characteristic of the *Cds* in the circuit. The switching circuit of the timer circuit includes a first integrating circuit or network by which the quantity of light sensed by the Cds from the field or scene to be photographed develops a trigger output to a switching circuit whose output controls the closing of an electric shutter in a camera. The switching circuit has a trigger-level-determining network or circuit and a second integrating circuit or network and compares the voltage determined by the trigger-level-determining circuit with the voltage output of the light quantity integrating circuit and makes the trigger level itself a function of time.

1 Claim, 4 Drawing Figures

ILLUMINATION-TIME CHARACTERISTIC CIRCUIT FOR ELECTRIC EYE CAMERAS

This is a continuation, of application Ser. No. 127,103, filed Mar. 23, 1971 now abandoned.

BACKGROUND OF THE INVENTION

This invention relates generally to electric eye cameras and more particularly to built-in electronic exposure timer circuits for such cameras.

DESCRIPTION OF PRIOR ART

The known built-in exposure timer circuits for electric eye cameras are unable to automatically accurately control the exposure because photoconductive cells or elements used in these devices are nonlinear. That is the illumination-resistance characteristic of these devices is nonlinear. Integrating circuits are used in the exposure times circuits to correct for this nonlinearity but no provision is made for making the trigger level of the switching circuits thereof a function of time.

SUMMARY OF THE INVENTION

It is a principal object of the present invention to provide an illumination-time characteristic correction circuit of an electronic exposure timer circuit.

A built-in electronic exposure timer circuit according to the invention comprises a first integrating circuit having a photoconductive cell sensing the light from a field or scene of which a photographic exposure is to be taken and means to develop a trigger output corresponding to an integration of the quantity of light sensed by the photoconductive cell. A switching circuit is triggered by the trigger output for applying an output controlling the exposure time of an electric shutter. A trigger-level determining circuit or network is provided in the switching circuit by which the trigger level is made a function of time by a second integrating circuit or network. Thus an illumination-time characteristic correction is effected and the circuit corrects for the nonlinearity of the illumination-resistance characteristic of the photoconductive cell.

BRIEF DESCRIPTION OF THE DRAWINGS

Other features and advantages of the circuit in accordance with the invention will be better understood from the following description of examples of the invention, appended claims and drawings in which;

DESCRIPTION OF THE PREFERRED EMBODIMENTS

Figure 1:
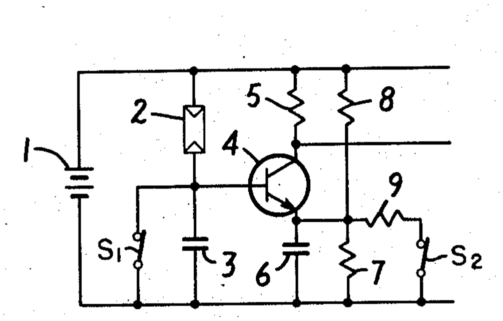
FIG. 1 is a diagram of an embodiment of an exposure time correction circuit according to the present invention.

In accordance with FIG. 1 a battery or source of power 1 has a cadmium sulfide photoconductive cell or light-controlled switch 2 connected to a positive side of the battery 1 and in series with a capacitor 3 connected to the negative side of the battery 1. A transistor 4 has its three electrodes connected to the battery 3. Its base is connected to the negative terminal of the battery through the capacitor 3 and its collector is connected to the positive terminal of the battery through a resistor 5. The emitter of the transistor is connected through a second capacitor 6 to the negative terminal of the battery. A resistor 7 is connected in series with another resistor 8 across the battery. The first resistor 7 is connected to the negative side of the battery and the other resistor 8 is connected to the positive terminal.

A third resistor 9 is connected at a junction between the other two resistors 7, 8 connected to the emitter of the transistor 4. A normally closed switch $S_1$ is connected across the first-mentioned capacitor and a second closed switch $S_2$ in series with the third resistor 9 of the network connects it to the negative terminal of the battery. The two switches $S_1$, $S_2$ are opened by mechanisms, not shown, when the release lever or button of the camera is actuated, i.e., at the start of the operation of the camera electric shutter, not shown.

The circuit described above is an ordinary exposure time control circuit except for the second capacitor 6, the third resistor 9 of the resistive network and its associated second switch $S_2$. At the time the two switches $S_1$, $S_2$ are opened the first capacitor 3 is charged at a rate corresponding to the resistance value of the light-controlled switch 2. This switch and its capacitor 3 function as a first integrating circuit integrating the quantity of light sensed by the photoconductive cell 2. The transistor 4 and its associated components form a switching circuit which has a given trigger level determined by trigger level determining elements and receives the trigger output of the integrating circuit for applying a control output controlling the exposure time of the electronic shutter, not shown, of the camera.

As the light-controlled switch 2 controls the rate of the charging of its associated capacitor 3 the second capacitor 6 is also concurrently charged at a rate determined by the resistance values of two of the resistors 7, 8 of the three-resistor network connected to the emitter of the transistor 4. The second capacitor and associated resistor network function as a second integrating circuit or network in the switching circuit making the trigger level of the switching circuit a function of time as hereinafter explained.

Figure 2:
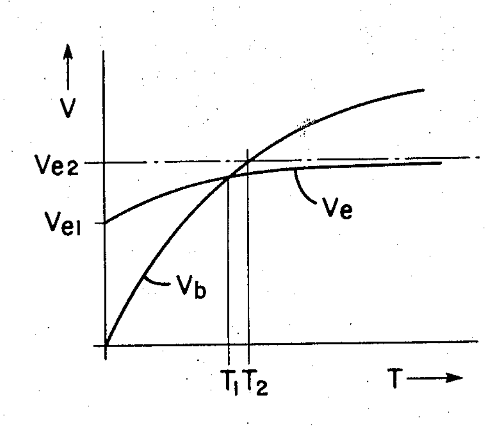
FIG. 2 is a diagram illustrating the action of the circuit in FIG. 1.

The process of what takes place in the circuit in FIG. 1 is shown in the explanatory diagram of FIG. 2 in which the abscissa is time T and the ordinate voltage V. In the diagram a curve V*b* illustrated the charging rate of the first capacitor 3 and a second curve V*e* illustrates the charging rate of the second capacitor. The voltage V*e*1 is the initial voltage level of the switching circuit capacitor 6 and its value is determined by the resistor network 7, 8, 9. As the charging procedes a higher voltage V*e*2 is approached and this is determined asymptotically by two resistors 7, 8 of the three-resistor network.

The transistor 4 becomes conductive when $Vb=Ve$ and an output is developed at its collector. In the event the emitter capacitor 6 were not provided the transistor would be conductive when $Vb=Ve2$. These two times are denoted $T_1$, $T_2$ on the diagram in FIG. 2. Since the difference $T_2-T_1=\Delta T$ is a function of the value of the resistance of the photoconductive cell a shutter exposure time-illumination characteristic different from the resistance cadmium-sulfide-illumination characteristic will be obtained. This embodiment of the invention is particularly applied to a cell normally having an illumination characteristic such that there is overexposure, in the absence of the invention, when the brightness of the object being photographed is high.

Figure 3:
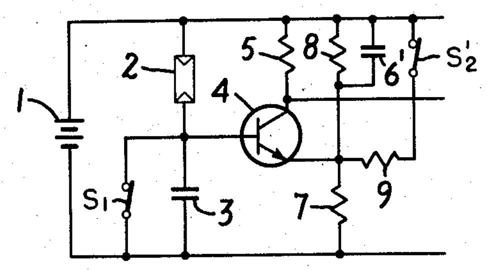
FIG. 3 is a diagram of another embodiment of an exposure time correction circuit according to the invention.

A second embodiment of a circuit according to the invention is illustrated in FIG. 3. In this embodiment the components or elements corresponding to those in the first embodiment have the same reference numerals. In this instance an emitter resistor 6' is connected to the positive terminal of the battery as well as the second switch S'2.

Figure 4:
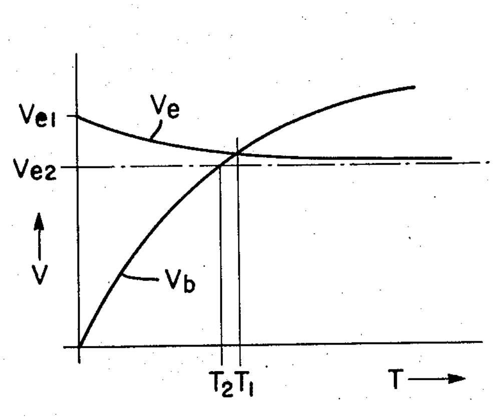
FIG. 4 is a diagram illustrating the action of the circuit in FIG. 3.

The correcting action of this embodiment is different as can be seen in FIG. 4. When the switches S', S'2 are opened at the start of the opening of the shutter the first integrating circuit capacitor 3 is charged at a rate corresponding to and determined by the resistance value of the photoconductive cell indicated by a curve V*b*. At the same time the emitter capacitor 6' is charged at a rate corresponding to or determined by the resistance value of two resistors 7, 8 of the emitter network. The charging rate of the emitter capacitor is shown by a curve Ve.

A voltage Ve1 is the initial voltage of the emitter capacitor 6' and is determined by a resistance value of the three-resistor network 7, 8, 9. As the charging of the capacitors proceeds simultaneously as before the voltage Ve1 approaches a voltage Ve2 determined by two resistors 7, 8 asymptotically of the network. The transistor 4 becomes conductive when V*b*=V*e* and produces an output voltage signal at its collector for closing the electric shutter, not shown, to determine the exposure time.

In case the emitter capacitor were not provided the transistor 4 would become conductive when V*b*=V*e*2. The time of these occurrences is denoted on the time axis by $T_1$ and $T_2$. Since the difference $T1-T2=\Delta T$ is a function of the value of the resistance of the cadmium sulfide cell as in the first embodiment a shutter exposure time-illumination characteristic different from the resistance cadmium-sulfide=illumination characteristic is obtained.

This embodiment of a circuit according to the invention is effective for a program type electric shutter in which the sector or blade of the shutter takes the pole of the irris concurrently. Namely the value of r that represents the resistance of C*ds*-illumination characteristic and is used in such a shutter as mentioned above, is less than 1 in the range up to the full opening of the sector or usually of the order of 0.5. After the sector is opened the *r* should approach 1 asymptotically.

Since it is difficult to manufacture C*ds* of this type as a single unit a way of dividing the electrodes of the C*ds* and adding a correction circuit to it has been performed. The use of two C*ds* of different characteristics has been considered. According to the present embodiment by using a single C*ds* it is possible to obtain a proper exposure time, when the brightness of an object being photographed is high, by a relation similar to the case of making the *r* of the C*ds* less than unity (1), and when the brightness of an object being photographed is low by a relation similar to the case when r approaches unity (1) asymptotically.

By suitably selecting the emitter capacitor 6' in each case and the values of the emitter network resistors 7, 8, 9 we are able to obtain a time-illumination characteristic of different relation from the resistance of the C*ds*-illumination. The correction circuit of the invention provides a greater freedom of correction than heretofore possible and a much simpler and inexpensive construction. By using hitherto well known correction means in conjunction with the correction circuitry of the invention the freedom and scope of correction can be enlarged, namely, it is possible to connect a resistor between the base of the transistor 4 and the parallel switch S1 or to connect a resistor between the capacitor 4 and the negative terminal of the power source 1 to improve the range of correction possible.

In the circuitry described the exposure time of the shutter changes in geometrical progression for corresponding changes of illumination, but an exposure time that changes in arithmetical progression for the change of illumination can be obtained as well. Moreover, while the mode of operation has been described as having the two-switches $S_1$, $S_2$ opened at the same time the two switches need not be opened at the same time since it is possible to correct the correct the correction value by which the exposure time is corrected by opening the switches at a definite time interval between the two openings. This interval is then taken into consideration in the development of the correction time value applied to the exposure time.

Those skilled in the art will understand that while the switching circuit is illustrated as constructed by using a transistor 4 other semiconductor elements may be used, for example a field effect transistor (FET) may be used for carrying out the principles and features of the invention.

I claim:

1. An exposure time control circuit for a camera having an electric eye and an electrically controlled shutter comprising a first integrating circuit including a photoelectric element receiving in operation light from a scene being photographed and a first capacitor charged under control of said photoelectric element receiving in operation light from a scene being photographed for developing a trigger voltage representative of the quantity of light incident on said photoelectric element, a switching circuit connected to said first integrating circuit and having a semiconductor element triggered by said trigger voltage, a second integrating circuit compensating for the non-linearity of said photoelectric element and comprising a second capacitor, a resistor network in said second integrating circuit determining the charging rate of the second capacitor and determining in conjunction therewith the trigger level of said switching circuit, a power source connected to both of the capacitors, a first switch enabling said first integrating circuit when opened in operation, and a second switch enabling said second integrating circuit when opened in operation simultaneously with said first switch for switching said switching circuit when it reaches the trigger level of said switching circuit.

* * * * *